United States Patent
Arai et al.

(10) Patent No.: US 6,671,444 B1
(45) Date of Patent: Dec. 30, 2003

(54) OPTICAL FIBER

(75) Inventors: Shinichi Arai, Tokyo (JP); Takeshi Yagi, Tokyo (JP); Kunihiko Mori, Tokyo (JP); Hidehiko Takara, Tokyo (JP); Satoki Kawanishi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 197 days.

(21) Appl. No.: 09/763,850

(22) PCT Filed: Jun. 30, 2000

(86) PCT No.: PCT/JP00/04328

§ 371 (c)(1),
(2), (4) Date: May 21, 2001

(87) PCT Pub. No.: WO01/02904

PCT Pub. Date: Jan. 11, 2001

(30) Foreign Application Priority Data

Jun. 30, 1999 (JP) ............................................. 11/185461

(51) Int. Cl.[7] ............................. G02B 6/02; G02B 6/17; G02B 6/22

(52) U.S. Cl. ........................ 385/126; 385/122; 385/123; 385/146

(58) Field of Search ................................. 385/122–128, 385/146

(56) References Cited

U.S. PATENT DOCUMENTS 5,504,829 A * 4/1996 Evans et al. ................. 385/123
5,960,146 A * 9/1999 Okuno et al. ............... 385/122

FOREIGN PATENT DOCUMENTS

| EP | 0 886 174 A2 | 6/1998 |
| JP | 08-082718 | 3/1996 |
| JP | 09-236834 | 9/1997 |
| JP | 10-090737 | 4/1998 |
| JP | 11-174503 | 7/1999 |

OTHER PUBLICATIONS

Kawano, et al (1999) Numerical Analysis of Supercontinuum Spectrum Generation in a Dispersion Flattened/Decreasing Fiber. IEICE Tech. Rept. 99(92): 43–48.

Mori, et al (1997) Mechanism of Supercontinuum Generation in a Singlemode Optical Fiber. IEICE Tech. Rept. 86(359):55–59.

Sone, et al (1998) Numerical Analysis of Supercontinuum Generation and Pulse Compression Effects in an Optical Fiber with Varying Propagation Characteristics Along Axis. IEICE Tech. Rept. 98(148):13–18.

* cited by examiner

Primary Examiner—Hemang Sanghavi
Assistant Examiner—Omar Rojas
(74) Attorney, Agent, or Firm—Knobbe, Martens, Olson & Bear LLP.

(57) ABSTRACT

An optical fiber, capable of generating by means of nonlinear phenomena, white light in adequately broadened wavelength bands at both sides of a pumping optical pulse that is input, and stabilizing the polarized conditions. The fiber is formed by covering a core with a first cladding, and covering the first cladding with a second cladding, where the second cladding has a refractive index greater than that of the first cladding, but lower than that of the core. Stress-applying parts are provided inside the second cladding so as to sandwich the core from both sides to form a polarization-maintaining optical fiber. The shortest distance between the stress-applying parts is made 2.3 times or more the mode field diameter for the wavelength of the pumping optical pulse.

7 Claims, 4 Drawing Sheets

(a)

(b)

OPTICAL FIBER

FIELD OF THE ART

This invention concerns an optical fiber that is used as a light source, for example, for wavelength division multiplexed optical transmission and with which a pumping optical pulse of a high peak output is made incident into the optical fiber to generate white light (super continuum light), which has a wide wavelength band at both sides of the pumping optical pulse.

BACKGROUND ART

With the development of optical communication technologies in recent years, wavelength division multiplexed optical transmission (WDM), with which a plurality of signal light, which mutually differ in wavelength, are multiplexed and transmitted through a single optical fiber, has come to be put to practical use. Wavelength division multiplexed optical transmission enables light of a plurality of wavelengths to be transmitted through a single optical fiber and is thus an optical transmission method that is suited for high-capacity, high-speed communication. Wavelength division multiplexed transmission is presently carried out by the application of an erbium-doped optical fiber type optical amplifier. Also, wavelength division multiplexed optical transmission is carried out in a wavelength band of 1.5 $\mu$m, which is the gain band of the abovementioned optical amplifier.

In recent years, higher transmission speeds are being desired in optical communication that apply the above-described wavelength division multiplexed optical transmission. Light sources, using super continuum (SC) light, which is pulsed light of a wide wavelength width and substantially rectangular shape, are being noted as means for satisfying this demand. For example, Japanese Unexamined Patent Publication No. 90737 of 1998 proposes an optical fiber that generates the abovementioned SC light and a light source that uses this optical fiber.

SC light is generated when a pumping optical pulse of high peak power is made incident into a nonlinear medium having a dispersion decreasing zone, with which the wavelength dispersion changes, for example, from positive dispersion (anomalous dispersion) to negative dispersion (normal dispersion), along the length direction, from the side of incidence of light towards the side of exit of the light. The generation of SC light is a phenomenon in which an optical Kerr effect occurs as the abovementioned pumping optical pulse propagates through the abovementioned dispersion decreasing zone, causing wavelength broadening and pulse compression of the pumping optical pulse, and four-wave mixing and other nonlinear optical effects occur additionally to lead to the generation of a short pulse that is broadened to a wide wavelength band. When light of new wavelengths are generated by nonlinear phenomena at both sides of the wavelength of the input pumping light and these light of new wavelengths propagate through the nonlinear medium, new light are generated again by nonlinear phenomena at both sides of the wavelengths of the former new light. It is considered that the wavelength width of the spectrum is broadened by the repeated generation of such new light, leading to the generation of a substantially rectangular optical pulse with optical intensity over a wide bandwidth.

As has been mentioned above, SC light is white light that is generated in the wavelength bands at both sides of a pumping optical pulse of high peak power that is made to enter an optical fiber or other nonlinear medium, and this SC light may be obtained with a single pumping light source and a single SC light generating optical fiber. Thus by dividing the SC light by means of a wavelength division device, a plurality of light that mutually differ in wavelength may be obtained in a far more economical manner in comparison to methods that require the preparation of the same number of light sources as the number of signals to be transmitted.

Presently, a 1.5 $\mu$m wavelength band erbium-doped optical fiber type optical amplifier is used for wavelength division multiplexed transmission. In the case where this optical fiber type optical amplifier is used to input pumping optical pulses into an optical fiber for SC light generation, SC light will be generated at the wavelength bands at both sides of the 1.5 $\mu$m wavelength band. However, with prior-art optical fibers for wavelength division multiplexed transmission, absorption and an accompanying trailing edge occur near a wavelength of 1.4 $\mu$m at the short wavelength side of the 1.5 $\mu$m wavelength band due to OH groups that are incorporated in the process of manufacture of the optical fiber. When such a portion in which the optical fiber transmission loss is large exists in the wavelength range in which SC light is generated, the intensity of the generated light becomes attenuated during propagation, thereby obstructing the broadening of the wavelength width of the spectrum and the making of the spectrum rectangular in shape. Thus the wavelength width of the spectrum of SC light was limited at the short wavelength side of the 1.5 $\mu$m wavelength band due to the abovementioned absorption, etc. by the OH groups.

Also, in generating SC light using an optical fiber, it is preferable that the polarized condition within the optical fiber not vary so that effective use can be made of the nonlinear phenomena within the optical fiber. The SC light generating optical fiber may thus be formed for example from a PANDA type polarization-maintaining optical fiber and thereby made to maintain the polarization. A PANDA type polarization-maintaining optical fiber is formed by providing a pair of stress-applying parts, which apply stress to the core, so as to sandwich the core from both sides. However, due to the effects of forming the stress-applying parts, SC light of adequate wavelength width could not be obtained from this type of PANDA type polarization-maintaining optical fiber even in the proposed example described above.

This invention has been made to solve the above problems. An object of this invention is to provide a white light generating optical fiber for wavelength division multiplexed transmission that has the following first to third characteristics. That is, the first characteristic of the optical fiber of this invention is that it can generate white light (SC light) that is adequately broadened in wavelength, the second characteristic is that the polarization is maintained so that nonlinear phenomena will occur efficiently, and the third characteristic is that the ill effects that accompany the maintaining of polarization can be avoided or lessened.

DISCLOSURE OF THE INVENTION

In order to achieve the above object, this invention provides the following arrangements as means for solving the problems. That is, the first arrangement of this invention is an optical fiber, which generates white light by means of nonlinear phenomenon in the wavelength bands at both sides of a pumping optical pulse that is input, and this optical fiber is characterized in being formed by covering the surroundings of the core by a first cladding, which is lower in refractive index than the core and covering the surroundings of the first cladding by a second cladding, which is higher in refractive index than the first cladding but lower in refractive index than the abovementioned core, by having, in at least part of the length direction of the optical fiber, a portion in which the wavelength dispersion gradient for the wavelength band at the wavelength side shorter than the wavelength of the pumping optical path is positive and the wavelength dispersion gradient for the wavelength band at the wavelength side longer than the wavelength of the pumping optical path is negative, by having, in at least part of the length direction of the optical fiber, a zone in which the wavelength dispersion for the wavelength of the pumping optical pulse varies from anomalous dispersion to normal dispersion from the side at which the pumping optical pulse is made incident towards the side at which light exits, and by having a transmission loss of the optical fiber that is 10 dB/km or less for light at a wavelength in the vicinity of 1.4 μm.

The second arrangement of this invention is characterized in that, in addition to having the characteristics of the above-described first arrangement, the ratio (Δ2/Δ1) of the specific refractive index difference Δ1 of the abovementioned core with respect to the abovementioned second cladding and the specific refractive index difference Δ2 of the abovementioned first cladding with respect to the abovementioned second cladding is set in the range, −0.4 to −0.85, the ratio of the outer diameter of the abovementioned core to the outer diameter of the abovementioned first cladding is set in the range, 0.4 to 0.7, and the abovementioned specific refractive index difference Δ1 is set in the range, 0.6 to 1.2%.

The third arrangement of this invention is characterized in that, in addition to having the characteristics of the above-described first or second arrangement, the optical fiber has a polarization-maintaining mechanism that maintains the polarized condition of the light that propagates through the fiber.

The fourth arrangement of this invention is characterized in that, in addition to having the characteristics of the above-described third arrangement, the abovementioned polarization-maintaining mechanism is formed by making the cross-sectional shape of at least one of either the core or the first cladding an elliptical shape.

The fifth arrangement of this invention is characterized in that, in addition to having the characteristics of the above-described fourth arrangement, the: ratio of the major diameter to the minor diameter of the abovementioned elliptical shape is set in the range, 1.3 to 2.0.

The sixth arrangement of this invention is characterized in that, in addition to having the characteristics of the above-described third arrangement, the abovementioned polarization maintaining mechanism is formed by providing a pair of stress-applying parts inside the second cladding, which apply stress to the core, so as to sandwich the core from both sides and this pair of stress-applying parts is made axially symmetrical with respect to the abovementioned core.

The seventh arrangement of this invention is characterized in that, in addition to having the characteristics of the above-described sixth arrangement, the shortest distance between the abovementioned pair of stress-applying parts is 2.3 times or more the mode field diameter for the wavelength of the pumping optical pulse.

The eighth arrangement of this invention is characterized in that, in addition to having the characteristics of the above-described sixth arrangement, the diameter of the abovementioned stress-applying parts is 25 to 37 μm.

The ninth arrangement of this invention is characterized in that, in addition to having the characteristics of the above-described first arrangement, the outer diameter of at least one of either the abovementioned core or the first cladding varies along the length direction of the optical fiber.

The tenth arrangement of this invention is characterized in that, in addition to having the characteristics of the above-described first arrangement, the incidence efficiency of the light that is made incident into the abovementioned optical fiber is greater than the exit efficiency of light that exits the optical fiber.

The eleventh arrangement of this invention is characterized in that, in addition to having the characteristics of the above-described first arrangement, the specific refractive index of at least one of either the abovementioned core or the abovementioned first cladding varies along the length direction of the optical fiber.

The twelfth arrangement of this invention is characterized in that, in addition to having the characteristics of the above-described first arrangement, at least the abovementioned core is formed by the VAD method.

This invention provides an optical fiber with which the wavelength dispersion characteristics and dispersion gradient characteristics are determined so as to enable white light to be readily obtained and with which the transmission loss characteristics at a wavelength of 1.4 μm, which prevent wavelength broadening at the short wavelength side of white light that is generated at the short wavelength side of the 1.55 μm wavelength band, are made small. This invention therefore provides an optical fiber that can generate white light (SC light) of an adequately broadened wavelength.

Also, with the second arrangement of this invention, the refractive index profile of the optical fiber and the ratio of the core diameter to the first cladding diameter can be optimized to provide an optical fiber that exhibits the abovementioned excellent effects.

When an optical fiber is used, having a portion in which the wavelength dispersion characteristic is substantially flat, and a pumping optical pulse, having a wavelength in the range of flat wavelength dispersion, is made incident into the optical fiber, SC light will be generated at both sides of the incident light. In order to generate SC light in a desired wavelength range, it is important to obtain an optical fiber with a portion which has zero wavelength dispersion and is flat in wavelength dispersion in the desired wavelength range.

With the second arrangement of this invention, the cladding has a two-layer structure and the refractive index profile thereof is a so-called W type profile. With this W-type profile, a portion, in which the dispersion is zero and the wavelength dispersion is flat (portion in which the wavelength dispersion is zero and flat) can be set in the desired wavelength range that includes the 1.5 μm wavelength band. Since a quartz optical fiber has the lowest transmission loss at a wavelength of approximately 1.5 to 1.6 μm, SC light can be generated in a wavelength range of low transmission loss by setting the abovementioned flat portion close to 1.5 μm.

Though an optical fiber having a portion, in which the wavelength dispersion is zero and flat in the 1.5 μm wavelength band, may be realized for example with an optical fiber with a four-layer cladding structure, such an optical fiber will be complex in structure. Thus when such a type of optical fiber is used, it will be difficult to accurately control the portion that is flat in wavelength dispersion at the zero dispersion wavelength. In contrast, the second arrangement of this invention enables a portion, which has zero dispersion and is flat in wavelength dispersion in a desired wavelength range that includes the 1.5 µm wavelength band, to be set with a relatively simple arrangement, and it thus provides a structure that is best in terms of productivity.

Furthermore, with the third arrangement of this invention, since it becomes possible to stabilize the polarized condition of the light that propagates through the optical fiber, white light of good characteristics can be obtained.

Furthermore, with the fourth to sixth arrangements of this invention, a polarization-maintaining fiber for arranging an optical fiber that exhibits the abovementioned excellent effects can be formed readily by making the cross-sectional shape of at least one of either the core or the first cladding an elliptical shape or by providing stress-applying parts in an axially symmetrical manner so as to sandwich the core.

Furthermore, with the seventh and eighth arrangements of this invention, the interval and diameter of the stress-applying parts provided in the optical fiber are optimized. Thus with an optical fiber having these arrangements, the prevention of the broadening of white light (SC light) is restricted without fail by the provision of stress-applying parts and the polarized conditions in the respective wavelengths can be maintained along the length direction of the optical fiber. The seventh and eighth arrangements of this invention can thus provide an optical fiber with which white light of an adequately broadened wavelength can be generated even more definitely.

Furthermore, with the ninth through eleventh arrangements of this invention, since the dispersion characteristics can be varied along the length direction of the optical fiber by varying the outer diameter or the specific refractive index of at least one of either the core or the first cladding, an optical fiber for generating white light can be readily obtained.

Since the optical fiber of this invention has wavelength decreasing characteristics, the coupling efficiency to the optical fiber may differ at the incident and exit ends. However, with the tenth arrangement of this invention, since optimization is carried out so that the efficiency of incidence into the optical fiber is made greater than the efficiency of exit from the optical fiber, the pumping light from a pumping optical pulse source can be coupled to the SC light efficiently and SC light can thus be generated efficiently.

Furthermore, with the twelfth arrangement of this invention, since at least the core is formed by the VAD method, an optical fiber that exhibits the abovementioned excellent effects can be readily formed.

BEST MODE FOR CARRYING OUT THE INVENTION

Embodiments of this invention shall now be described in accordance with the attached drawings to provide a more detailed description of this invention.

The optical fiber of the present embodiment is an optical fiber, which generates, by means of nonlinear phenomenon, white light (SC light) in the wavelength bands at both sides of a 1.55 µm wavelength band optical pulse that is input as the pumping optical pulse. The optical fiber of this embodiment is formed from a polarization-maintaining optical fiber having a zero dispersion wavelength in the wavelength band in which the abovementioned white light is generated.

Figure 1:
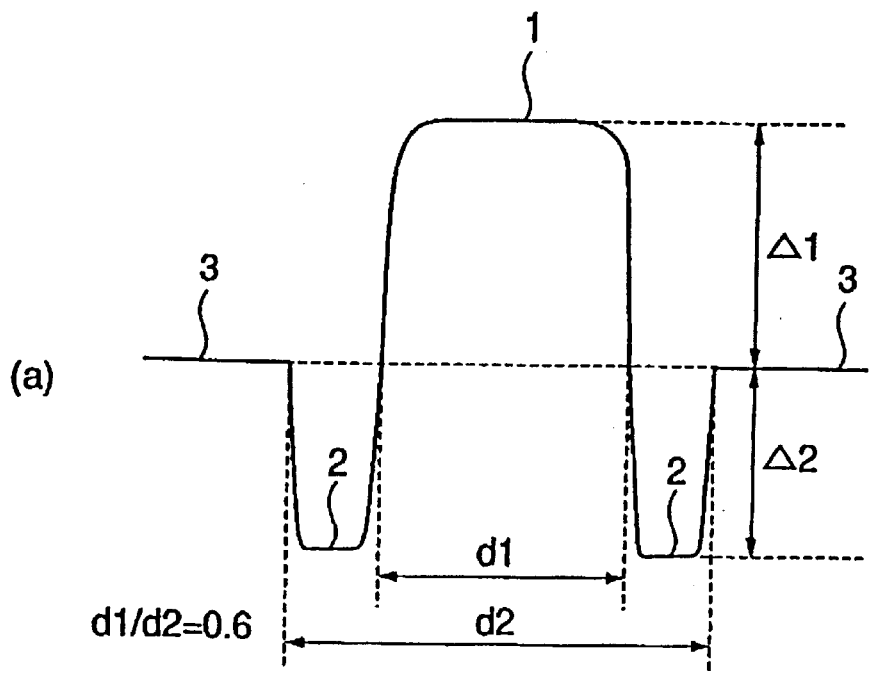
FIG. 1 shows arrangement drawings of the principal parts of an embodiment of an optical fiber according to the present invention with (a) being a refractive index profile and (b) being a transverse section.
Figure 1:
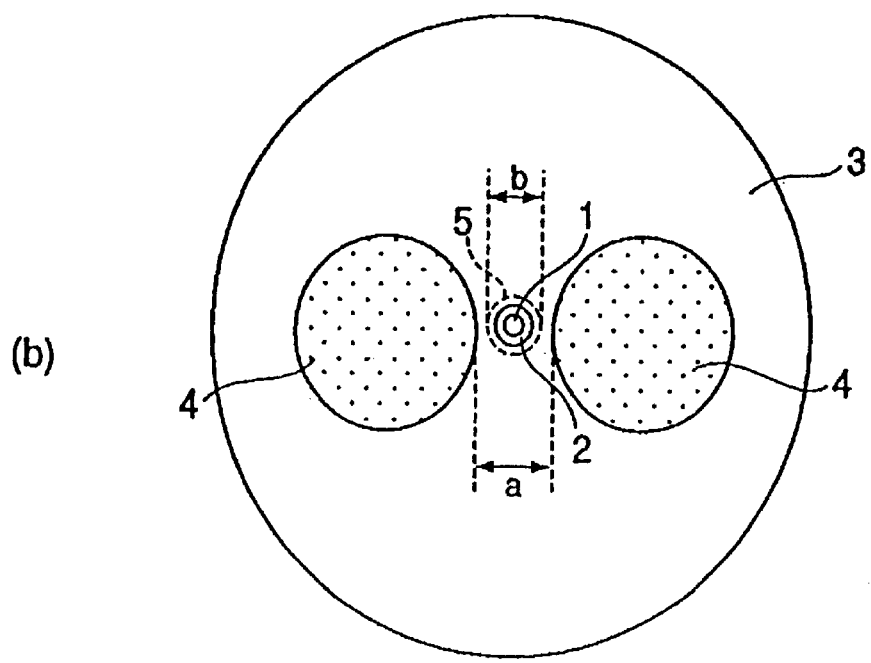

FIG. 1 shows arrangement diagrams of the principal parts of the embodiment of the optical fiber by this invention. (a) of this Figure shows the refractive index profile of the optical fiber and (b) of this Figure is a transverse section of the optical fiber.

As illustrated in these drawings, the optical fiber of this embodiment is formed by covering the surroundings of a core 1 with a first cladding 2, which is lower in refractive index than core 1, and covering the surroundings of first cladding 2 with a second cladding 3, which is higher in refractive index than first cladding 2 but lower in refractive index than core 1. The specific refractive index difference Δ1 of core 1 with respect to second cladding 3 is 0.6 to 1.2% (for example, 0.74%). The specific refractive index difference Δ2 of first cladding 2 with respect to second cladding 3 is less than 0 (for example, −0.58%). The ratio (Δ2/Δ1) of the specific refractive index difference Δ1 and the specific refractive index difference Δ2 is −0.4 to −0.85, and the ratio of the outer diameter of core 1 to the outer diameter of first cladding 2 is 0.4 to 0.7.

When the specific refractive index of core 1, with the refractive index of the vacuum being set to 1, is given as $n_1$, the specific refractive index of first cladding 2 is given as $n_2$, and the specific refractive index of second cladding 3 is given as $n_3$, the respective specific refractive index differences Δ1 and Δ2 are defined by the formulae (1) and (2) below. As has been mentioned above, the unit of the respective refractive index differences Δ1 and Δ2 is %.

$$\Delta 1 = \{(n_1^2 - n_3^2)/2n_1^2\} \times 100 \quad (1)$$

$$\Delta 2 = \{(n_2^2 - n_3^2)/2n_2^2\} \times 100 \quad (2)$$

Also as shown in FIG. 1(b), a pair of stress-applying parts 4, which apply stress to core 1, is provided inside second cladding 3 of the optical fiber of this embodiment so as to sandwich core 1 from both sides. This pair of stress-applying parts 4 is made axially symmetrical with respect to core 1, and the stress-applying parts 4 are made for example of quartz glass doped with boronia ($B_2O_3$). By applying stress to core 1 by stress-applying parts 4, the optical fiber is made a PANDA type polarization-maintaining optical fiber in which birefringence is induced in core 1. The shortest distance a between the pair of stress-applying parts 4 at the portion at which the wavelength dispersion in the pumping wavelength becomes zero is set to 2.3 times or more the mode field diameter (diameter of mode field 5) of the optical fiber for the wavelength of the pumping optical pulse.

Also, the diameter and the boronia concentration of stress-applying parts 4 should be selected appropriately so as to induce an adequate birefringence in core 1 and enable adequate polarization cross-talk to be obtained with the optical fiber. In the case where the outer diameter is 125 μm, the diameter of stress-applying parts 4 is preferably in the range, 25 to 37 μm, so that stress-applying parts 4 will be able to adequately induce birefringence in core 1.

Figure 2:
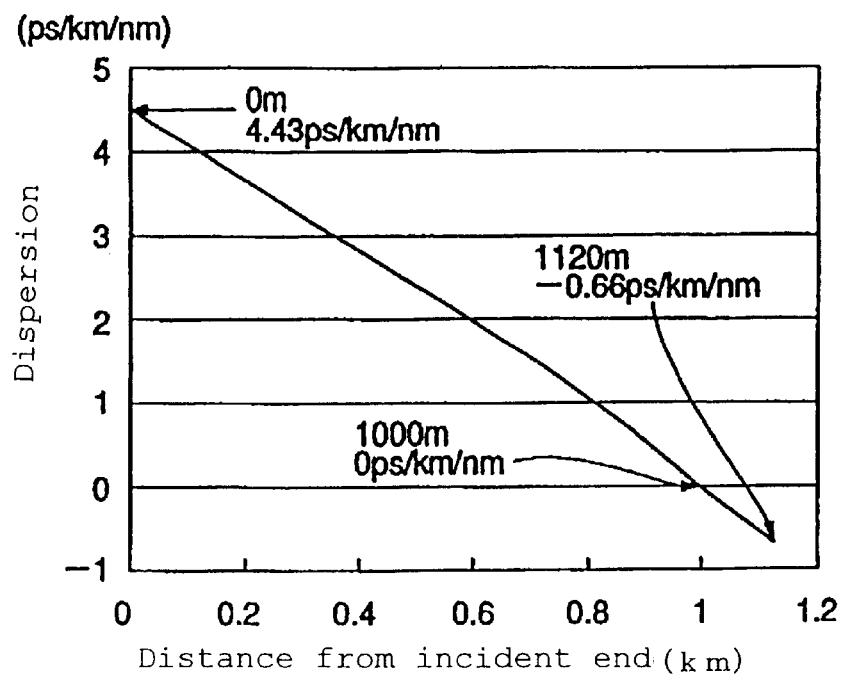
FIG. 2 is a graph, which illustrates the wavelength dispersion characteristics along the length direction of the optical fiber of the abovementioned embodiment for a wavelength of 1550 nm.
Figure 3:
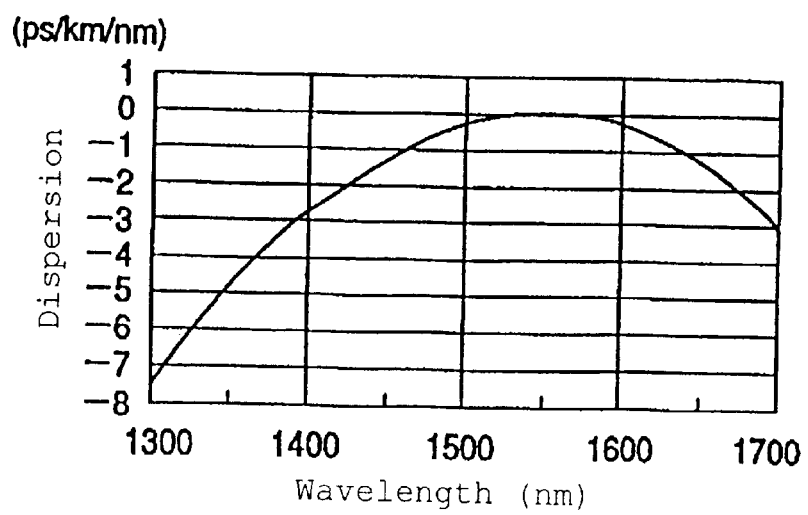
FIG. 3 is a graph, which illustrates the wavelength dispersion characteristics of a portion 1000 m from the incident side of the optical fiber of the abovementioned embodiment.

FIGS. 2 and 3 show examples of the wavelength dispersion characteristics of this embodiment. For example as shown in FIG. 2, the optical fiber has a dispersion decreasing zone in which the wavelength dispersion (the wavelength dispersion for a wavelength of 1.55 μm in this Figure) varies along the length direction, from the side of incidence of the pumping optical pulse to the exit side, in the direction decreasing from positive dispersion (anomalous dispersion) to negative dispersion (normal dispersion). With the present embodiment, the total length of the optical fiber is made a dispersion decreasing zone in which the wavelength dispersion decreases monotonously with the distance from the side of incidence.

Also as shown in FIG. 3, the optical fiber of this embodiment has, in at least part of the length direction of the optical fiber, a portion in which the wavelength dispersion gradient for the wavelength band at the wavelength side shorter than the wavelength of 1.55 μm is positive and the wavelength dispersion gradient for the wavelength band at the wavelength side longer than the wavelength of 1.55 μm is negative. In this Figure, the dispersion value for a wavelength of 1.55 μm is zero.

Furthermore, core 1 and first cladding 2 of the optical fiber of this embodiment become reduced in diameter along the length direction of the optical fiber, from the incidence side towards the exit side. The optical transmission loss of the optical fiber of this embodiment in the vicinity of a wavelength of 1.4 μm is made 10 dB/km or less.

The optical fiber of this embodiment is arranged in the manner described above and is formed, for example, as shall now be described. That is, the respective parts that are to become core 1, first cladding 2, and second cladding 3 are formed by the VAD (Vapor-phase Axial Deposition) method and made into transparent glass. Holes of a circular sectional shape, which pass through the optical fiber in the length direction are formed, in a manner so as to sandwich the core 1 portion from both sides in an axially symmetrical manner, in the second cladding 3 portions of the optical fiber base material that has been made into transparent glass. Meanwhile, members that are to become the cylindrical stress-applying parts 4 to be inserted into these holes are formed from quartz glass doped with boronia. After then inserting the members that are to become the cylindrical stress-applying parts 4 into the abovementioned holes of the optical fiber base material, the optical fiber base material is drawn.

In forming the optical fiber base material, the base material is formed for example so that the portion that is to become core 1 will come to have a reduced diameter along the length direction of the optical fiber, from the incidence side towards the exit side. By doing so, core 1 comes to have a reduced diameter along the length direction of the optical fiber, from the incidence side towards the exit side, in the optical fiber after drawing.

The present embodiment is formed in the manner described above, and in order to specify the arrangement of this embodiment, the present inventor carried out the following examination. That is, first, the refractive index profile was optimized to make the optical fiber having, in at least part of the length direction of the optical fiber, a portion with which the wavelength dispersion gradient is positive for the wavelength band at the wavelength side shorter than 1.55 μm, which is the pumping wavelength, and the wavelength dispersion gradient is negative for the wavelength band at the wavelength side longer than 1.55 μm, which is the pumping wavelength. This optimization of the refractive index profile is carried out by changing the refractive index profile of the optical fiber in various manners.

As a result, the refractive index profile shown in FIG. 1(a) was determined; the ratio ($\Delta 2/\Delta 1$) of the specific refractive index difference $\Delta 1$ and specific refractive index difference $\Delta 2$ was determined to be $-0.4$ to $-0.85$, the ratio of the outer diameter of core 1 to the outer diameter of first cladding 2 was determined to be 0.4 to 0.7, and the abovementioned specific refractive index difference $\Delta 1$ was determined to be 0.6 to 1.2%. Though an optical fiber with the above-described wavelength dispersion characteristics may be formed as long as the specific refractive index difference $\Delta 1$ is in the abovementioned range, the above-described wavelength dispersion characteristics can be more obtained more definitely if the specific refractive index difference $\Delta 1$ is set in the range, 0.6 to 1.0%.

As is well known, white light (SC light) is generated when a pumping optical pulse of a high peak power is made incident into an optical fiber or other optical transmission medium having a dispersion decreasing zone, in which the wavelength dispersion varies in the direction of decreasing, for example from positive dispersion to negative dispersion, along the length direction of the optical fiber, from the side of incidence of the light towards the side of exit. The generation of SC light is considered to be a phenomenon in which, due to progressive wavelength broadening and pulse compression of the pumping optical pulse by the optical Kerr effect and the additional effects of four-wave mixing and other nonlinear optical phenomena, a short pulse that is broadened to a broad wavelength range is generated. The abovementioned nonlinear phenomena occur more readily in the case where the wavelength dispersion of the portion, in which the wavelength dispersion gradient for the pumping wavelength varies from positive to negative, is zero.

Thus in the present embodiment, a dispersion decreasing zone was formed across the entire length of the optical fiber and the optical fiber was made into one having zero dispersion in the vicinity of a wavelength of 1.55 μm in a part of the length direction of the optical fiber as shown in FIG. 3. As a whole, the present embodiment was arranged as an optical fiber having zero dispersion in the wavelength band of generation of white light.

Figure 4:
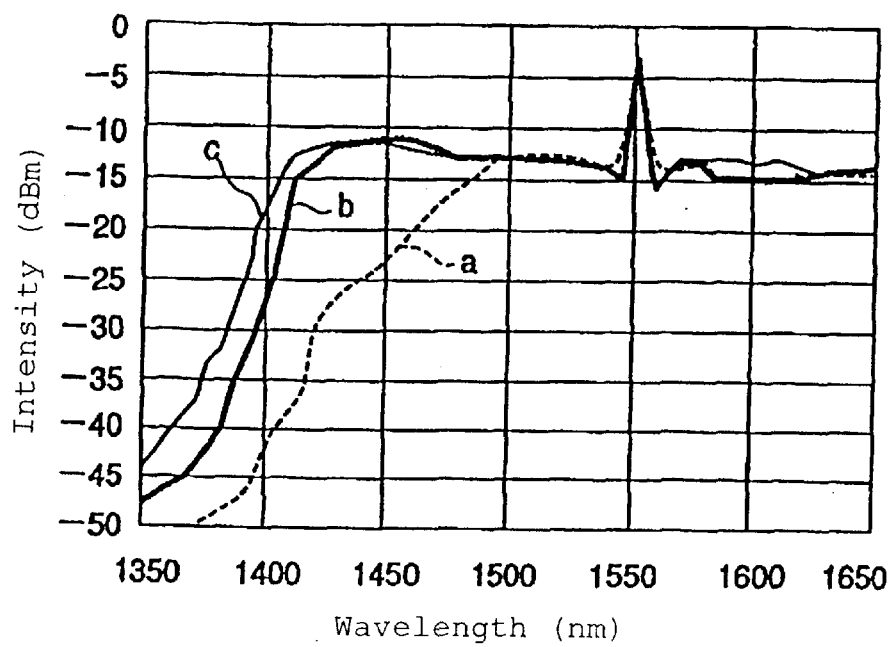
FIG. 4 is a graph, which shows the respective spectra of exiting SC light generated by optical fibers that differ in the OH-group absorbance peak values.

FIG. 4 shows the results of generating white light by making a pumping optical pulse with a central pulse wavelength of 1550 nm, peak pulse power of 2W, and pulse half-width of 3ps incident respectively into three types of optical fibers that differ in the absorption peak of the OH group. The OH group absorption peaks of the optical fibers were adjusted in the following manner. First, a soot, comprised of core 1 and first cladding 2, was formed by VAD. Next, the chlorine partial pressure of the ambient atmosphere during baking of the soot was varied to adjust the water content within the soot, which is dehydrated by the chlorine. The proportion of OH groups in the optical fiber was thereby varied to vary the absorption peak. The spectra a, b, and c of FIG. 4 correspond to light emitted from optical fibers for which the OH group peaks are 15 dB/km, 5 dB/km, and 0.1 dB/km, respectively.

As is clear from the spectra a to c of FIG. 4, the intensity at the low wavelength side of the emitted light spectrum is greater for an optical fiber with a lower OH group absorption peak. That is, by making the OH group absorption peak small, the spectral width of the white light, which is generated when a pumping optical pulse of a 1550 nm wavelength is made incident into an optical fiber, can be broadened to the short wavelength side.

Figure 5:
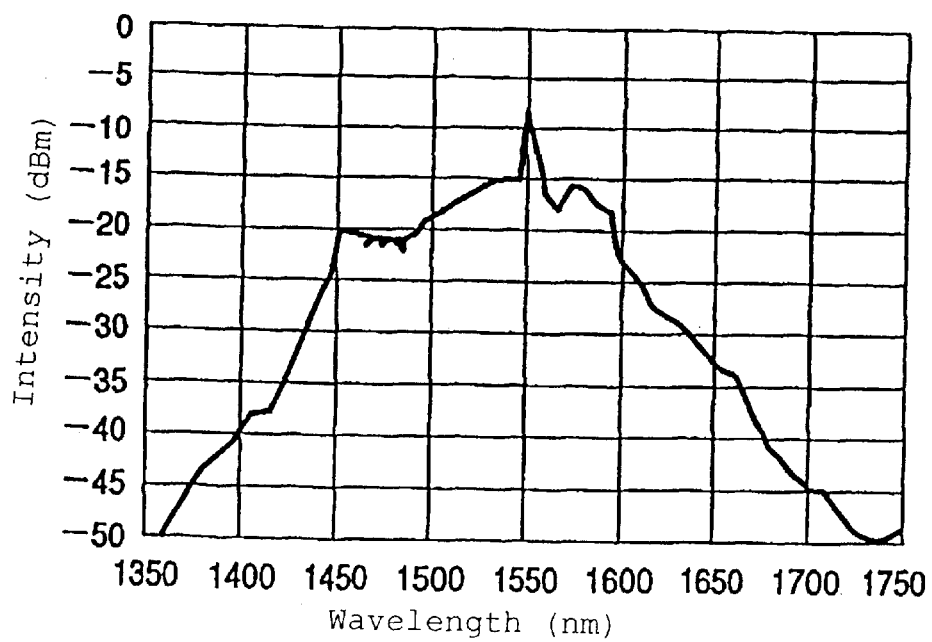
FIG. 5 is a graph, which illustrates an example of a spectrum of exiting SC light generated by a polarization-maintaining optical fiber formed by providing stress-applying parts.
Figure 6:
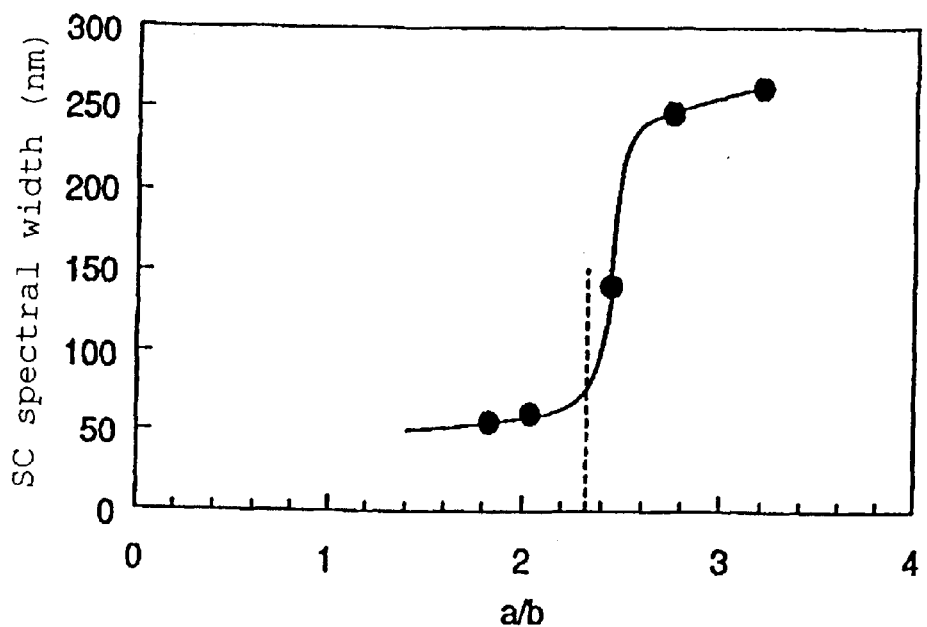
FIG. 6 is a graph, which illustrates an example of the relationship between the SC spectral width and the ratio a/b of the shortest distance a between a pair of stress-applying parts and the mode field diameter b for the wavelength of a pumping optical pulse at the portion at which the wavelength dispersion is zero for the wavelength of the incident pulse light.

The design for making the optical fiber polarization-maintaining shall now be described. When the design of the stress-applying parts is not optimized, the spectral width of the SC light will be narrow as shown for example in FIG. 5. Thus the ratio a/b of the shortest distance a between stress-applying parts 4 to the mode field diameter b for the wavelength of the pumping optical pulse was varied and optimized so that the spectral width of the SC light will be maximized. The results shown in FIG. 6 show that the spectrum of the SC light is broadened satisfactorily when the abovementioned ratio a/b is 2.3 or more.

With the present embodiment, the refractive index profile was optimized, the wavelength dispersion characteristics and dispersion gradient characteristics were determined, the transmission loss characteristic at a wavelength of 1.4 $\mu$m was determined, stress-applying parts 4 were provided to make the optical fiber polarization-maintaining, and the interval of the stress-applying parts 4 was optimized based on the results of the above examination. The present embodiment thus enables dependence on polarized conditions to be avoided and can provide an optical fiber that can generate white light (SC light) of an adequately broadened wavelength.

This invention is not limited to the above-described embodiment and may take various modes of practice. For example, though a polarization-maintaining optical fiber was given above as an example of a white light generating optical fiber, the optical fiber of this invention is not necessarily limited to a polarization maintaining optical fiber.

Figure 7:
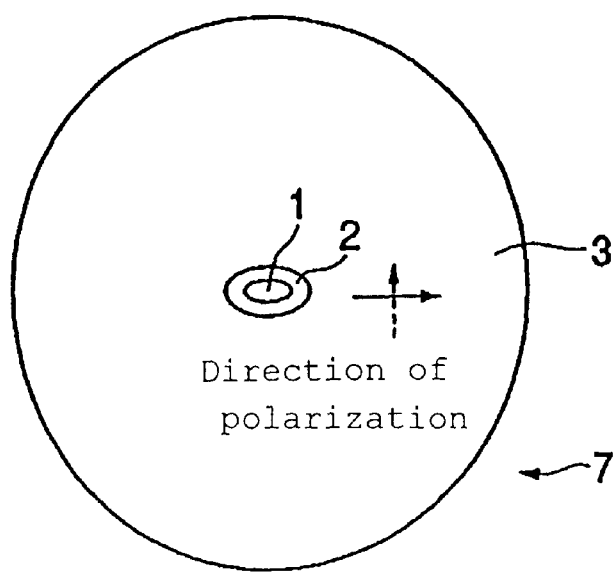
FIG. 7 is an explanatory diagram, which illustrates the cross-sectional arrangement of another embodiment of the optical fiber according to the present invention.

Also though a polarization-maintaining optical fiber was made by the provision of stress-applying parts 4 in the above-described embodiment, the arrangement of the polarization-maintaining optical fiber is not limited in particular. The polarization-maintaining optical fiber may for example be one with which the cross-sectional shape of at least one of either core 1 or first cladding 2 is an elliptical shape as shown in FIG. 7 (in this Figure, the cross-sectional shapes of both core 1 and first cladding 2 are elliptical shapes). In this case, the effects of absorption by the boronia that forms the stress-applying parts 4 and absorption by the OH groups can be restricted or avoided to enable white light of a good quality to be obtained.

The arrows in FIG. 7 respectively show the basic polarization components of the polarization-maintaining optical fiber shown in the Figure, and these polarization components are formed in the major diameter direction and minor diameter direction of the elliptical core 1.

Also, in the case where the cross-sectional shape of core 1 or first cladding 2 is made an elliptical shape, though the ratio of the major diameter to the minor diameter of the ellipse is selected appropriately to obtain adequate polarization cross-talk, it is preferable for the ratio of the major diameter to the minor diameter of the ellipse to be 1.3 to 2.0.

If the ratio of the major diameter to the minor diameter of the ellipse is made less than 1.3, the maintenance of polarization is made difficult and it will become difficult to make the extinction ratio large. Also, when the ratio of the major diameter to the minor diameter of the ellipse is made greater than 2.0, since it becomes difficult to control the ellipticity and the refractive index profile becomes unstable, the productivity will be poor.

Furthermore, though the optical fiber of the above-described embodiment was provided with a pair of stress-applying parts 4 that sandwich core 1 from both sides, the optical fiber may have 2 pairs or more of stress-applying parts 4. Also, the optical fiber may be a polarization-maintaining optical fiber having stress-applying parts 4 provided so as to surround core 1 in an axially symmetrical manner with respect to core 1. When stress-applying parts 4 are provided so as to surround core 1, it is preferable to appropriately set the shortest distance between the inner circumferences of the stress-applying parts 4 so as to reduce the effects that stress-applying part 4 will have on the spectrum of the white light.

Furthermore, though the outer diameter of core 1 and the outer diameter of first cladding 2 were varied along the length direction of the optical fiber as a method of varying the wavelength dispersion along the length direction of the optical fiber in the embodiment described above, this method is not restricted in particular. For example with this invention, the method of varying the outer diameter of at least one of either core 1 or first cladding 2 may be used or a method of varying the specific refractive index (refractive index with the refractive index of the vacuum being set to 1) of at least one of either core 1 or first cladding 2 along the length direction of the optical fiber may be used. Also with this invention, the abovementioned methods may be combined to vary the wavelength dispersion along the length direction of the optical fiber.

For example, if core 1 is to be synthesized by the VAD method, the synthesis conditions may be varied during soot synthesis (for example by varying the amount of dopant along the length direction of the preform) to vary the refractive index of core 1. Also in the process of synthesizing first cladding 2, the synthesis conditions for the portion that is to form the first cladding part may be varied during soot synthesis (for example by varying the amount of dopant along the length direction of the preform) to vary the refractive index of first cladding 2. An optical fiber with which the specific refractive index of at least one of either core 1 or first cladding 2 varies along the length direction of the optical fiber may be manufactured thus.

The ratio of core 1 and first cladding 2 may also be varied along the length direction of the preform by varying the amount of layered soot during soot synthesis to realize an optical fiber with which the outer diameter of at least one of the above components is varied.

Furthermore, an optical fiber, with which the specific refractive index of at least one of either core 1 or first cladding 2 varies along the length direction of the optical fiber may be made by varying the soot glass process conditions along the length direction of the preform in the process of forming core 1 and first cladding 2. In this case, an optical fiber, with which the specific refractive index varies along the length direction may also be realized by varying the amount of dopant contained in the ambient gas during the glassing stage of the soot glass process.

INDUSTRIAL APPLICABILITY

As has been described above, the optical fiber of the present invention has wavelength dispersion characteristics and dispersion gradient characteristics that enable white light to be readily obtained and is an optical fiber with which white light, which is generated broadly at the longer wavelength side and shorter wavelength side of a wavelength band of 1.55 μm, can be obtained. The optical fiber of the present invention is thus suitable as an optical fiber that can generate white light (SC light) that is adequately broadened in wavelength and is applicable as a light source for wavelength division multiplexed transmission in the 1.55 μm wavelength band.

What is claimed is:

1. An optical fiber, which generates white light by means of the nonlinear phenomenon in the wavelength bands at both sides of a pumping optical pulse that is input, wherein said optical fiber is formed by covering the surroundings of a core by a first cladding, which is lower in refractive index than said core and covering the surroundings of said first cladding by a second cladding, which is greater in refractive index than said first cladding but lower in refractive index than said core, by having in at least part of the length direction of said optical fiber, a portion in which the wavelength dispersion gradient for the wavelength band at the shorter wavelength side of the wavelength of the pumping optical path is positive and the wavelength dispersion gradient for the wavelength band at the longer wavelength side of the wavelength of the pumping optical path is negative, by having in at least part of the length direction of said optical fiber, a zone in which the wavelength. dispersion for the wavelength of the pumping optical pulse varies from anomalous dispersion to normal dispersion from the side at which the pumping optical pulse is made incident towards the side at which light exits, and by by having a transmission loss of the optical fiber that is 10 dB/km or less for light of a wavelength in the vicinity of 1.4 μm, having a polarization-maintaining mechanism that maintains the polarization of the light that propagates through said optical fiber, wherein the polarization-maintaining mechanism is formed by having a pair of stress-applying parts inside the second cladding so as to sandwich the core, wherein the shortest distance between the pair of stress-applying parts is 2.3 times or more the mode field diameter for the wavelength of the pumping optical pulse.

2. An optical fiber as set forth in claim 1, wherein the ratio (Δ2/Δ1) of the specific refractive index difference Δ1 of said core with respect to said second cladding and the specific refractive index difference Δ2 of said first cladding with respect to said second cladding is set in the range, −0.4 to −0.85, the ratio of the outer diameter of said core to the outer diameter of said first cladding is set in the range, 0.4 to 0.7, and said specific refractive index difference Δ1 is set in the range, 0.6 to 1.2%.

3. An optical fiber as set forth in claim 1, wherein the diameter of the abovementioned stress-applying parts is 25 to 37 μm.

4. An optical fiber as set forth in claim 1, wherein the outer diameter of at least one of either the core or the first cladding varies along the length direction of the optical fiber.

5. An optical fiber as set forth in claim 1, wherein the incidence efficiency of the light that is made incident into said optical fiber is greater than the exit efficiency of light that exits the optical fiber.

6. An optical fiber as set forth in claim 1, wherein the specific refractive index of at least one of either the core or the first cladding varies along the length direction of the optical fiber.

7. An optical fiber as set forth in claim 1, wherein at least the core is formed by the VAD method.

* * * * *

UNITED STATES PATENT AND TRADEMARK OFFICE
CERTIFICATE OF CORRECTION

PATENT NO.      : 6,671,444 B1
APPLICATION NO. : 09/763850
DATED           : December 30, 2003
INVENTOR(S)     : Arai et al.

It is certified that error appears in the above-identified patent and that said Letters Patent is hereby corrected as shown below:

On title page Item (73) Assignee on the first page of the patent, after "The Furukawa Electric Co., Ltd., Tokyo (JP)", please add --Nippon Telegraph and Telephone Corporation, Tokyo (JP)--.

Signed and Sealed this

Thirtieth Day of September, 2008

JON W. DUDAS
*Director of the United States Patent and Trademark Office*